Nov. 26, 1940.　　　W. R. PERRY　　　2,222,987

ROTATION INDICATOR

Filed July 30, 1938

INVENTOR.
BY William R. Perry,
Hood + Hahn.
ATTORNEYS.

Patented Nov. 26, 1940

2,222,987

UNITED STATES PATENT OFFICE 2,222,987

ROTATION INDICATOR

William R. Perry, Columbus, Ind., assignor to Reeves Pulley Company, Columbus, Ind., a corporation of Indiana Application July 30, 1938, Serial No. 222,152

3 Claims. (Cl. 116—124)

The present application relates to a rotation indicator, and more particularly to a device which, when rotated upon its own axis, will indicate the number of rotations through which it has been turned from a reference point, and will further indicate fractions of rotations.

The primary object of the invention is to provide means of the character indicated wherein, through very simple mechanism, the amount of displacement of a rotatable element from a reference point will be indicated. A further object of the invention is to provide means of the character above described adapted to be set into a recess in a rotatable hand wheel. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 1:
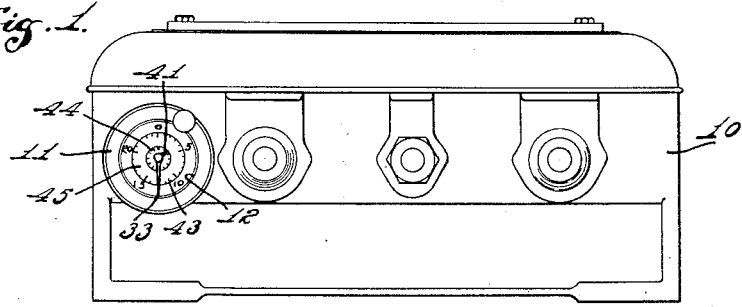
Fig. 1 is a side elevation of a Reeves type variable speed transmission having the rotation indicator of the present application associated therewith.

Referring more particularly to the drawing, it will be seen that I have illustrated generally a variable speed transmission 10 provided with a hand-wheel 11 for shifting the parts of the transmission to vary the speed ratio thereof. Said hand-wheel is of standard construction except for the fact that it is formed in its outer face with a socket 12 in which is received the substantially cylindrical casing 13 of the indicator of the present application. Preferably, said casing is cup shaped, as illustrated, and is formed, at a suitable point in the periphery of its mouth, with a lug 14 for a purpose later to be described.

Coaxially mounted in the housing 13 is an axle 15 which is fixedly associated with the base of the housing and which projects toward the mouth of said housing. Journaled upon said axle is an element 16 provided at one point with a weight 17, whereby said element 16 is weight-biased against movement with the housing about the axis of the axle 15.

Figure 2:
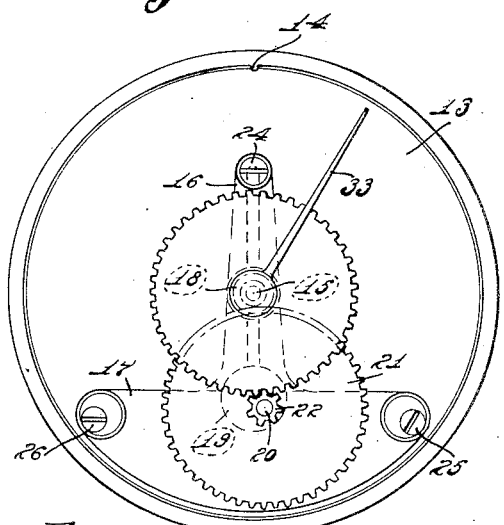
Fig. 2 is an enlarged front elevation of the device, the dial and cover plate having been removed.
Figure 3:
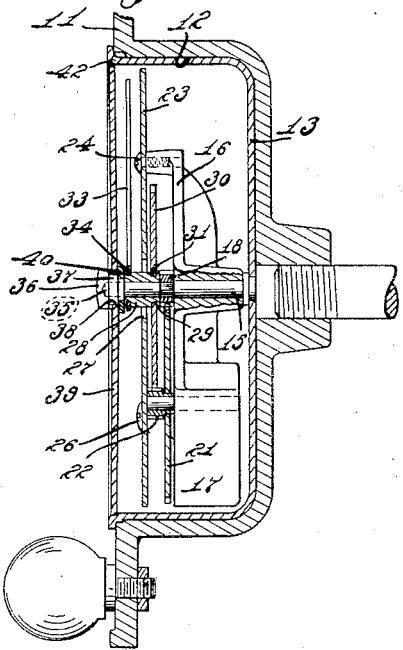
Fig. 3 is a transverse section, upon the scale of Fig. 2, through the hand wheel of Fig. 1.

Adjacent the hub of said element 16, a pinion 18 is fixed to the axle 15. A table or platform 19 is formed upon the weighted portion 17 of the element 16, and is adapted to receive and support a trunnion 20 or a trunnion 20'. In the embodiments of Figs. 2 and 3, the trunnion 20 has journaled thereon a gear-and-pinion unit comprising a gear 21 and a pinion 22, fixedly associated with each other upon a common axis. The gear 21 meshes with the pinion 18.

A graduated dial 23 is secured to the element 16 by screws 24, 25 and 26; said dial being coaxial with the axle 15 and being formed with a central aperture 27. The dial is preferably formed of a material adapted readily to receive, and to have removed therefrom, pencil or ink marks, for a reason later to be explained.

A gear-and-pointer unit, comprising a hub 28 having a reduced portion receiving a gear 30 and peened over as at 29 to hold said gear against a shoulder 31, and an opposite reduced portion receiving a pointer 33 and peened over or riveted over to hold said pointer against a shoulder 34, is journaled on said axle 15, the hub 28 being positioned within said aperture 27. The gear 30 meshes with the pinion 22, while the pointer 33 is positioned to sweep the graduated dial 23.

The free extremity 35 of the axle 15 is threaded to receive a nut comprising a knurled head 36 and a stem 37. Said stem is received in an aperture 38 centrally formed in a transparent cover sheet 39; and a collar 40 is secured on said stem inside said cover sheet 39, whereby said cover sheet is supported on and by said nut.

Thus it will be seen that said nut constitutes means for securing the cover 39 fixedly in place and that its knurled head 36 constitutes a thumb piece whereby the nut and cover may be manipulated.

Suitably integrated with the transparent cover sheet is a pointer 41. Said pointer may be formed in any manner, to be movable with the cover sheet; but I prefer to apply said pointer to the cover sheet by printing, or the like. The cover sheet is formed with a notch 42 aligned with said pointer 41, said notch cooperating with the lug 14 formed on the housing.

Obviously, as the hand wheel 11 is rotated, carrying with it the housing 13 the weight 17 will hold the element 16 against rotation; so that the pinion 18 will drive the gear 21, whereby the pinion 22 will be rotated to drive the gear 30 with which the pointer 33 is directly connected.

The dial 23 being secured to the element 16 will be held against rotation; and the result will be that the pointer 33 will be moved over the face of the dial in the direction of rotation of the casing, but at a very much slower rate. The pointer 41, being integrated with the transparent cover sheet 39 which is fixedly associated with the housing 13, will be moved over the face of the dial at a rate equal to that of the housing. Thus, the pointer 41 accurately measures fractions of rotations, while the pointer 33 indicates complete rotations. The dial may obviously be so graduated that each complete rotation of the casing will move the pointer 33 one division of the scale graduation. In the illustrated embodiment of the invention, the pointer 33 thus cooperates with the scale 43 while the pointer 41 cooperates with the second scale 44.

Figure 4:
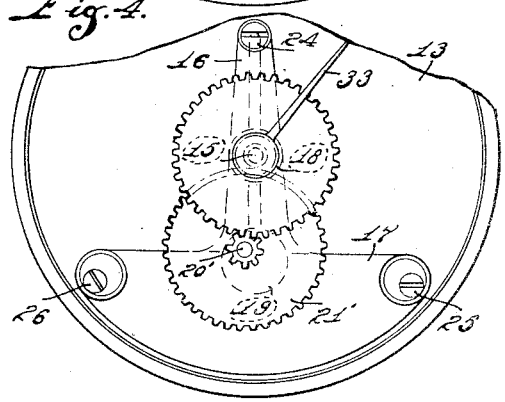
Fig. 4 is a fragmental elevation, similar to Fig. 2, but illustrating a modified gear train to which the device is adaptable.

In Fig. 4, I have illustrated a pin 20' replacing the pin 20 of Figs. 2 and 3. A gear 21' of a pitch diameter considerably less than that of the gear 21, is journaled on the pin 20' and meshes with the pinion 18; whereby the rate of movement of the pointer 33 will be materially increased. Obviously, the scale corresponding to the scale 43 will be differently graduated if the organization of Fig. 4 is used. As obviously, a pin corresponding to the pin 20 or 20' might be positioned in any one of innumerable locations on the platform 19, in order to provide for various ratios between the rate of movement of the housing 13 and the rate of movement of the pointer 33.

As has been stated, the dial 23 is preferably formed of a material adapted readily to receive, and to have removed therefrom, pencil and ink marks. It will be noted that said dial is so designed as to provide a relatively large annular space 45. This is for the purpose of permitting a user to calibrate his dial to suit his own convenience. Thus, when the rotation indicator of the present application is used in connection with variable speed transmissions, for instance, the user may calibrate his own dial so that the pointer 33 will indicate the rate of operation of the driven machine with respect to the material being operated upon by the machine. Thus, a paper manufacturer might desire to calibrate his dial to indicate feet per minute; or a doughnut manufacturer might calibrate his dial to indicate doughnuts per minute.

I claim as my invention:

1. In combination, a housing mounted for rotation about an axis, an axle coaxially fixedly mounted in said housing, an element journalled on said axle and yieldingly biased against movement therewith, a dial fixedly carried by said element, a pointer movable over the face of said dial, means providing a driving connection between said axle and said pointer, a transparent cover for said housing, and means operable to secure said cover fixedly in place on said housing to enclose all of said elements and to provide a view of said dial and said pointer, said last-mentioned means comprising a threaded member threadedly receivable by a threaded end portion of said axle, said threaded member having a thumb piece positioned outside said cover, and a reduced stem projecting through said cover.

2. In a device of the class described, a substantially cup-shaped housing, an axle coaxially fixedly mounted in the base of said cup and projecting toward the mouth thereof, a pinion fixedly mounted on said axle intermediate the ends thereof, an eccentrically weighted element journalled on said axle between the housing base and said pinion, a gear-and-pinion unit carried by said element and rotatable about an axis eccentric to said axle, the gear of said unit meshing with the pinion on said axle, a dial carried by said element and positioned between said gear-and-pinion unit and the mouth of said housing, said dial being formed with an aperture coaxial with said axle, a pointer unit comprising a hub projecting through said aperture, a gear larger than said aperture fixed on said hub and meshing with the pinion of said gear-and-pinon unit, and a pointer fixed on said hub and positioned between said dial and the mouth of said casing, and a cover unit comprising a transparent sheet, a nut threadedly receivable upon a threaded end portion of said axle, said nut having a thumb piece postioned outside said sheet, a reduced stem projecting through said sheet, and an enlarged collar positioned on said stem inside said sheet.

3. In a device of the class described, a substantially cup-shaped housing, an axle coaxially fixedly mounted in the base of said cup on a substantially horizontal axis and projecting toward the mouth of said cup, an eccentrically weighted element journalled on said axle, a graduated dial carried by said element, a pointer journalled for rotation about the axis of said axle and movable over the face of said dial, a reducing gear train providing a driving connection between said axle and said pointer, and a cover unit comprising a transparent sheet, a threaded member threadedly receivable by a threaded end portion of said axle, said threaded member having a thumb piece positioned outside said sheet, a reduced stem projecting through said sheet, an enlarged collar positioned on said stem inside said sheet, and a second pointer integrated with said sheet.

WILLIAM R. PERRY.